UNITED STATES PATENT OFFICE.

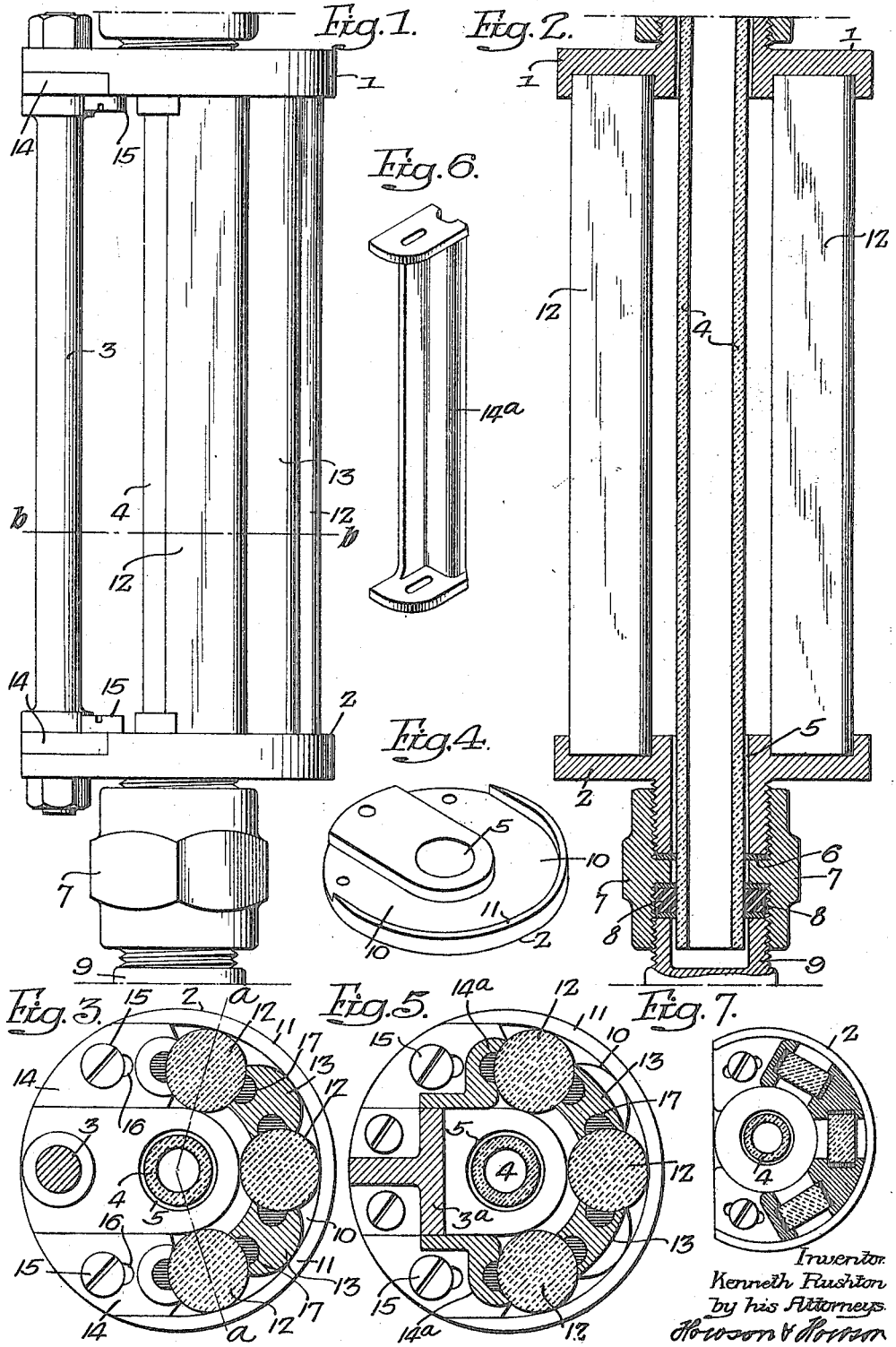

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

WATER-GAGE.

1,207,635.      Specification of Letters Patent.      Patented Dec. 5, 1916.

Application filed December 10, 1915. Serial No. 66,129.

*To all whom it may concern:*

Be it known that I, KENNETH RUSHTON, a citizen of the United States, residing in Philadelphia, Pennsylvania, have invented certain Improvements in Water-Gages, of which the following is a specification.

One object of my invention is to provide a transparent guard for a water gage so that the height of the water in the gage can be readily ascertained upon examination and in the event of the breaking of the glass of the gage, the particles of glass will be caught by the guard and will not be projected with the escaping steam and water, thus avoiding serious accidents.

A further object of the invention is to provide means whereby the parts can be quickly assembled and adjusted.

In the accompanying drawings: Figure 1 is a side view of my improved water gage; Fig. 2 is a vertical sectional view on the line *a—a*, Fig. 3; Fig. 3 is a sectional plan view on the line *b—b*, Fig. 1; Fig. 4 is a perspective view of the lower cap plate; Fig. 5 illustrates a construction in which the tube is entirely inclosed within the casing; Fig. 6 is a perspective view of one of the guards illustrated in Fig. 5; and Fig. 7 is a sectional plan view illustrating a modification of the invention.

The water gage proper consists of an upper cap 1 and a lower cap 2 rigidly connected by a post 3 so that the two caps are firmly held in position.

4 is a glass tube which is secured to the cap plates in the usual manner. In the present instance, the tube extends through openings 5 in each cap plate and is held in position by a washer 6 confined by a nut 7 which is adapted to the threaded portion of the cap plate.

8 is a rubber ring, which is clamped to the glass tube by the part 9, which is screwed into the nut 7 and this part 9 may be an extension of a neck leading to a valve, if desired. Both ends of the tube, in the present instance, are clamped to the cap plates in the usual manner. I lay no claim to this particular construction. It will be understood that the means of fastening the gage glass tube to the cap plates may be modified as desired. Each cap plate is recessed as at 10 forming a flange 11 and mounted in the recess are three cylindrical glass sections 12 and metallic spacing members 13. The glass sections and the spacing members can be inserted in the groove from the back and can be held in position by the clamp plates 14 which bear against the end glass sections and are held by screws 15 extending through slots 16 in the clamp plates and into threaded openings in the cap plates so that when the parts are assembled they form a guard which will prevent any particles of glass being carried with the escaping steam. The level of the water can be readily seen through any of the glass sections 12 so that the casing does not interfere with the examination of the gage.

I preferably form longitudinal grooves 17 in each wall of each spacing member and mount in these grooves a suitable packing and I preferably so arrange the packing that the joint will be practically steam tight. Furthermore, the packing is such that the pressure will be taken by the packing and not by the metallic spacing members. In some instances, instead of cylindrical glass sections illustrated in Fig. 3, glass sections rectangular in cross section may be used, as illustrated in Fig. 7, if desired, and instead of making the caps circular as shown in Fig. 3, the rear edge of each cap may be flat. In some cases, it may be desirable to inclose the gage glass and when this is done I may use the construction illustrated in Fig. 5. In this instance, I use a spacing member 3$^a$, T-shaped in cross section and secured to the cap plates. I substitute guards 14$^a$ for the clamps 14 illustrated in Fig. 3 and these guards occupy the space between the two cap plates and are adjustably mounted on the cap plates, in the same manner as the clamp plates illustrated in Fig. 3, but it will be understood, on referring to Fig. 5, that the space in which the gage glass is located is entirely inclosed so that the device can be made with the front protected or it can be entirely inclosed within the casing, as desired.

It will be seen that as the cylindrical glass sections are of clear glass the height of the water can be readily ascertained, as these glass sections are combined with the metallic spacing members and a guard is provided of such strength that when a gage glass breaks, due to excessive pressure, or due to an imperfection, the flying pieces of glass will be caught by the guard and will be prevented from doing injury to the attendants or those in close proximity to the boiler.

I claim:

1. The combination in a water gage, of two cap plates spaced apart; a gage glass secured to the two cap plates; a semicircular guard consisting of alternate transparent and opaque sections located in front of the glass; and means on the cap plates pressing against the edges of the guard and holding the guard sections in close contact, one with another.

2. The combination in a water gage, of two recessed cap plates spaced apart; a gage glass mounted with one end in each cap plate; a series of transparent and opaque guards arranged alternately and having their ends extending into the recesses of the cap plates; and clamps on the cap plates for holding the guards in position.

3. The combination in a water gage, of two cap plates; a gage glass extending from one cap plate to the other; a series of cylindrical glass rods extending from one cap plate to the other; spacing members located between the rods, each spacing member having a longitudinal groove therein; packing in each groove bearing against the surface of the glass rods; clamps on the cap plates for holding the rods and spacing members in close contact, said rods and spacing members forming a guard for the gage glass.

4. The combination in a water gage, of an upper and a lower cap plate; each cap plate having a segmental recess therein; a gage glass extending between the cap plates; alternate series of transparent and opaque sections extending from one cap plate to the other in front of the glass and mounted in the recesses; packing between the sections; slotted retaining plates mounted on the cap plates at each side and shaped to fit the transparent guards; and a screw passing through the slot of each plate and into the cap plates holding the said retaining plates in position and locking the guard members in the closed position.

5. The combination in a water gage, of two cap plates spaced apart; a post extending from one cap plate to the other and rigidly connecting said cap plates; a gage glass mounted in the cap plates and located in front of the post; a series of alternate transparent and opaque sections located in front of the gage glass; and guard clamps on each side of the gage glass, extending from one cap plate to the other and filling the space between the front guards and the post.

6. The combination in a water gage, of two cap plates, each having a central opening therein; a post extending from one cap plate to the other and rigidly connecting the said cap plates; a gage glass extending through the openings in the cap plates and confined therein, each cap plate having a semicircular recess therein; cylindrical glass rods extending from one cap plate to the other and mounted in the recesses; metallic spacing members located between the glass rods and less in width than the diameters of the rods so that a large area of each rod will be exposed, each spacing member being grooved; packing mounted in the grooves; clamp plates at each side of each cap plate bearing against the end glass rods; means for holding the clamp plates in position; the glass rods and spacing members forming a curved guard for the gage glass.

KENNETH RUSHTON.

Copies of this patent may be obtained for five cents each, by addressing the "Commissioner of Patents, Washington, D. C."